United States Patent [19]

Henning et al.

[11] Patent Number: 4,888,379

[45] Date of Patent: Dec. 19, 1989

[54] HEAT-SENSITIVE POLYURETHANE DISPERSIONS

[75] Inventors: Wolfgang Henning, Kuerten; Wolfram V. Langenthal, Pulheim; Hermann Perrey, Krefeld; Hellmut Striegler, Leverkusen, all of Fed. Rep. of Germany

[73] Assignee: Bayer Aktiengesellschaft, Leverkusen, Fed. Rep. of Germany

[21] Appl. No.: 64,680

[22] Filed: Jun. 22, 1987

[30] Foreign Application Priority Data

Jul. 5, 1986 [DE] Fed. Rep. of Germany ....... 3622612

[51] Int. Cl.$^4$ .................... C08L 75/08; C08L 75/04
[52] U.S. Cl. .................................. 524/500; 524/839
[58] Field of Search ............... 524/839, 840, 539, 500

[56] References Cited

U.S. PATENT DOCUMENTS

| | | | |
|---|---|---|---|
| 3,479,310 | 11/1969 | Dieterich | 524/591 |
| 4,046,729 | 9/1977 | Scriven | 528/68 |
| 4,066,591 | 1/1978 | Scriven | 428/426 |
| 4,171,391 | 10/1979 | Parker | 427/342 |
| 4,535,111 | 8/1985 | Perrey et al. | 524/199 |

FOREIGN PATENT DOCUMENTS

| | | |
|---|---|---|
| 0167189 | 1/1986 | European Pat. Off. . |
| 1570596 | 7/1969 | Fed. Rep. of Germany . |
| 2534304 | 2/1976 | Fed. Rep. of Germany . |
| 2516979 | 10/1976 | Fed. Rep. of Germany . |
| 2659617 | 7/1978 | Fed. Rep. of Germany . |
| 2837314 | 3/1979 | Fed. Rep. of Germany : |
| 3330197 | 2/1985 | Fed. Rep. of Germany . |

OTHER PUBLICATIONS

R. Buscall, T. Corner, J. F. Stageman, Polymer Colloids, Elsevier Appl. Sci. Publ., London–New York 1985, pp. 256–261.
R. J. Noble, Latex in Industry, Rubber Age, New York 1953, pp. 355–357.
Dr. Sinn, Heat sensitising agents for natural and synthetic latices in Polym. Paint and Colour Journal Latices and Dispersions Symposium, Hastings, May 14/15, 1974.

*Primary Examiner*—C. Warren Ivy
*Attorney, Agent, or Firm*—Connolly and Hutz

[57] ABSTRACT

This invention relates to heat-sensitive polyurethane dispersions and their use in the preparation of hollow articles by the dipping-process, for coating webs and the production of elastomeric filaments.

5 Claims, No Drawings

HEAT-SENSITIVE POLYURETHANE DISPERSIONS

Heat-sensitive latex mixtures are known per se. Natural latex or synthetic dispersions can be rendered heat-sensitive with heat-sensitizing agents. This heat sensitization and suitable agents for it are described, for example, in German Patent Specifications 1,268,828 and 1,494,037. A process for the preparation of synthetic rubber latices which can be rendered heat-sensitive is described, for example, in German Patent Specification 1,243,394.

Heat-sensitive polymer dispersion mixtures are distinguished by a coagulation temperature which remains constant over prolonged periods. This means that such mixtures remain entirely processable for days or weeks.

such heat-sensitive mixtures of polymer dispersions are used, for example, for impregnating fleeces or for the production of hollow articles by the dipping process (for example gloves), for coating webs or for the production of elastomeric filaments.

Oxyalkylated polysiloxanes are described as heat-sensitizing agents in the literature references mentioned. Other heat-sensitizing agents, such as polyvinylalkyl ethers, polyacetals, polyether-amines, polyether-urethanes, alkoxylated polyamines and polyether-polyurethane ureas, are moreover known from numerous publications.

Polyurethane dispersions, however, cannot be rendered heat-sensitive with the heat-sensitizing agents described. This is possibly due to the fact that the polyurethane dispersions are as a rule emulsifier-free ionomers. So-called emulsifier-free polymer dispersions which are formed under certain conditions of emulsion polymerization also cannot be rendered heat-sensitive, and the emulsifier system of the dispersion is evidently of great importance in respect of heat-sensitizing ability. On the other hand, like emulsifier-free emulsion polymer latices, polyurethane dispersions can readily be coagulated by additions of electrolyte (for example DE-OS (German Published Specification) 2,931,125).

Rendering any polymer dispersions heat-sensitive is described quite generally in European Patent A-0,167,189 (page 1 lines 26 to 28 and page 3 lines 1 to 4), and the impression that the above statements are thus refuted could be given.

However, these are not heat-sensitive mixtures in the actual sense, since the coagulation point does not remain constant for a prolonged period and the processability of the mixtures in question is accordingly also not guaranteed for longer than a short period of time. The process described in European Patent A-0,167,189 can be referred to as heat coagulation (page 4, lines 1 to 9, page 10, lines 25 to 29), but the process does not describe the rendering of polymer dispersions heat-sensitive in the sense of this invention.

The amounts of 20 and 30 percent by weight of heat-sensitizing agents, based on the solid in the polymer dispersion, mentioned as used in Examples 1 (page 10, lines 12 to 15) and 5 (pages 11, lines 27 to 32) of European Patent A-0,167,189 also influence the precipitated polymer in that these substances remain to such an extent that the chemical and physical properties of the polymer are changed to a technically unacceptable degree. The use of a blowing agent is furthermore essential for the invention and claimed in the process according to European Patent A-0,167,189. The products prepared by this process are therefore unsuitable for the production of, for example, gloves and elastomeric filaments, and if the blowing agent is dispensed with, as comparison examples 3 and 4 of the present application demonstrate, completely useless formulations result.

Under certain conditions, such as are described in DE-OS (German Published Specification) 2,659,617, even polyurethane dispersions which contain electrolytes and are stable at room temperature for a prolonged period and coagulate under the influence of heat can be prepared. The coagulation point of these dispersions, however, cannot be adjusted with accuracy and changes during storage thereof. In freshly prepared polyurethane dispersions, it is usually so high that they cannot be processed in the sense of heat-sensitive latex mixtures without problems. If it is sufficiently low in the freshly prepared state—given an appropriate composition of the polyurethane and suitable electrolytes—the coagulation point drops too rapidly so that the mixture has no storage stability.

There has been no lack of attempts to produce heat-sensitive behaviour of the polymer dispersion by addition of stabilizers and electrolytes. Although this has been successful in principle, G. Sinn in: "Polymers, Paint and Colour J. 5 (1975)" describes ethyleneoxide condensation products in which additions of electrolytes during use as a constituent of latices cause no spontaneous coagulation. Coagulation of the latex occurs only on heating.

This process is unsatisfactory, however, since the relatively high amounts of polyether required here have an adverse influence on the storage stability and the processing stability of the mixtures in respect of premature coagulation, and the coagulation properties of the system are completely inadequate for reliable use in practice.

Surprisingly, it has been found that polyurethane dispersions can be rendered heat-sensitive by additions of electrolytes if certain stabilizers are added to the dispersions.

The invention relates to heat-sensitive polyurethane dispersions consisting of polyurethane latices, electrolytes and stabilizers, characterized in that polyether-polyurethanes are employed as the stabilizers.

The polyether-polyurethanes used according to the invention are known. These are preferably water-soluble compounds which are obtained by reaction of polyvalent polyisocyanates with polyethers. They are described in German Offenlegungsschriften (German Published Specifications) 2,516,979 and 2,534,304.

Polyurea-modified polyether-polyurethanes which are described in DE-OS (German Published Specification) 3,330,197 and its corresponding U.S. Pat. No. 4,535,111 are particularly preferably used. They are prepared by reaction of polyvalent polyisocyanates with polyethers and polyamines.

In the publications cited, the polyether-polyurethanes are indeed presented as heat-sensitizing agents, but the process for heat sensitization described there cannot be applied to polyurethane dispersions.

The process according to the invention can be used on any desired aqueous polyurethane dispersions, regardless of whether they are anionic or cationically hydrophilically modified polyurethanes. If appropriate, the dispersions can also contain nonionic hydrophilic groups. The preparation of such polyurethane dispersions belongs to the known prior art and is described in the following literature references (selection): British Patent 1,076,688, German Patent Specification 1,184,946, DE-AS (German Published Specification) 1,495,745, DE-OS (German Published Specification) 1,495,847, DE-OS (German Published Specification) 2,035,732, DE-OS (German Published Specification) 2,344,135, DE-OS (German Published Specification) 2,446,440, U.S. Pat. No. 3,479,310, U.S. Pat. No. 3,756,992, U.S. Pat. No. 3,905,929, "Die angewandte Makromolekulare Chemie" 26, 85–106 (1972), and "Angewandte Chemie", 82, 53–63 (1970).

Starting materials which are used for the preparation of the polyurethane dispersions are the following compounds which are known per se in polyurethane chemistry:

(a) di- or polyisocyanates, (b) di- or polyhydroxy compounds, in particular polyhydroxy polyesters, -carbonates or -ethers, with a molecular weight of 500 to 10,000, (c) chain-extending agents with hydrogen atoms which are reactive towards isocyanate groups and have a molecular weight of 18 to 500, (d) ionic or potentially ionic block builders which, in addition to groups which are reactive towards isocyanate groups, contain at least one tertiary or quaternary ammonium group, a carboxylate or sulphonate group or a group which can be converted into such groups, (e) nonionic hydrophilic block-builders which, in addition to the groups which are reactive towards isocyanate groups, contain ethylene oxide units incorporated within a polyether chain, and (f) other auxiliaries and additives, such as solvents, neutralizing agents, catalysts and emulsufiers which are not fixed chemically.

The starting materials are described in detail in the literature references mentioned.

The content of (potentially) ionic and, if appropriate, nonionically hydrophilic builder components is as a rule chosen so that the polyurethane dispersions have a content of ionic groups, in particular of $=N^{\oplus}=$, $-COO^{\ominus}$ or $-SO_3^{\ominus}$ groups of 2 to 200 milliequivalents per 100 g of solid and a content of ethylene oxide units of 0 to 25% by weight, based on the solid.

The preparation of the polyurethane disperions is in general carried out by one of the following processes:

1. The "acetone process" according to DE-OS (German Published Specification) 1,495,745 and U.S. Pat. No. 3,479,310, according to which a prepolymer with terminal NCO groups is prepared in the melt and is dissolved in a suitable solvent and lengthened in solution with a chain-extending agent to give the polyurethane. The solution of the polyurethane is then mixed with water and the polyurethane dispersion is obtained by distilling off the solvent. This process is suitable for all the polyisocyanates mentioned for the formation of prepolymers, including the aromatic diisocyanates. Essentially only linear polyurethanes can be built up by this process, since cross-linked systems can easily lead to gelling in the organic phase.

2. A process using blocked amines or hydrazines as chain-extending agents according to DE-OS (German Published Specification) 2,725,589, U.S. Pat. No. 4,269,748, U.S. Pat. No. 4,192,937 and U.S. Pat. No. 4,292,226. In this process, a hydrophilic prepolymer containing terminal NCO groups is mixed with at least partly blocked amines or hydrazines in the absence of water and water is then added to this mixture, whereupon the previously blocked amine or hydrazine is liberated and reacts as a chain lengthener for the prepolymer. Aromatic diisocyanates can also be used in this process to form the prepolymers with terminal NCO groups, but the prepolymers with aliphatically and/or cycloaliphatically bonded NCO groups are preferred.

The "melt dispersion process" according to DE-OS (German Published Specification) 1,770,068, U.S. Pat. No. 3,756,992 and DE-OS (German Published Specification) 2,637,690, according to which the terminal NCO groups of the hydrophilic prepolymer are converted into acylated amines with urea, ammonia or other suitable compounds and these amines are converted into methylol groups by reaction with formaldehyde or related compounds, before, during or after the addition of water. On heating the dispersion, the methylol groups are condensed completely, water being split off and the polyurethane being formed. This process can be carried out with all polyisocyanates, including the aromatic diisocyanates.

4. A process with chain-extending of the prepolymers with terminal NCO groups in an aqueous medium by dispersion of the hydrophilic prepolymers in water and subsequent addition of the chain extender. To form the dispersion, it is possible either to add the water to the prepolymer or to add the prepolymer to the water. In the case of chain-extending in an aqueous medium, prepolymers with aliphatic and/or cycloaliphatic terminal NCO groups are particularly preferred. If aromatically bonded NCO end groups are used, masking of this isocyanate group before the addition of water is preferred, as is described in U.S. Pat. No. 4,387,181.

According to the invention, the dispersion of the polyurethanes can in principle be carried out by any desired process. These processes include, for example, dispersion without using dissolving agents, for example by mixing the polyurethane melts with water in apparatuses which can generate high shearing gradients, and the use of very small amounts of solvents for plasticizing during processing in the same apparatuses, and furthermore the aid of non-mechanical dispersing agents, such as soundwaves of extremely high frequency. However, it is also possible for simple mixers, for example stirred kettles or so-called reflux mixers, to be used, since the polyurethanes according to the invention are self-dispersible.

The polyurethane dispersions can also be blended with other dispersions, such as, for example, with dispersions of polyvinyl acetate, polyethylene, polystyrene, polybutadiene, polyvinyl chloride, polyacrylate and copolymer plastics.

Possible dilute aqueous electrolyte solutions for the preparation of the heat-sensitive latex mixtures are, in the case of anionic polyurethane dispersions, solutions of alkaline earth metal salts or salts of other metals, such as, for example, salts of aluminium, zinc or iron, or double salts, such as, for example, potassium aluminium sulphate. Particularly good results, especially in respect of colour stability of the polymer stucture obtained from the coagulate by drying, are found with calcium salts.

Additions of dilute alkali metal hydroxides and ammoniumhydroxide, and also alkali metal salts of very weak acids, such as potassium oleate, are suitable for cationic polyurethane dispersions. A one-molar solution, for example, is to be considered as a dilute solution here.

As described above, the polyether-polyurethanes described as heat-sensitizing agents in the literature act as a stabilizer at room temperature in the sense of the invention. During preparation of the mixture, the polyether-polyurethane is thus initially added to the polyurethane latex. Only then is the electrolyte solution added. If a mixture with a low solids content is to be prepared, it is advisable for the polyether-urethane and the electrolyte solution first to be diluted with the water required for the dilution. Homogeneous mixtures can be prepared more rapidly in this way than by predilution of the latex.

The solids content of the heat-sensitive polyurethane dispersion mixture has a slight influence on the coagulation point. If the mixing concentration is changed, the latter can be adjusted by varying the amounts of heat-sensitizing agent and electrolyte.

Other customary auxiliaries, such as dyestuffs, pigments or pigment slurries and fillers, as well as agents which impart hydrophobicity, can also be added to the mixture. Pulverulent pigments are predispersed in suitable grinding devices before addition to the latex mixture in the interests of uniform distribution. Fillers such as chalk, clay and barytes can be incorporated directly into the mixture. The average particle size and particle size distribution of the fillers of course influence the quality of the mixture and the articles produced therefrom.

Heat-sensitive polyurethane latex mixtures in the sense of the invention are advantageously prepared by bringing together the constituents of the mixture in the following sequence:

1. Polyurethane latex,
2. Polyether-polyurethane, prediluted with water,
3. If appropriate colouring agents, fillers and other customary auxiliaries (if appropriate predispersed) and
4. Dilute electrolye solution.

The polyether-polyurethane is added in amounts of 0.1 to 20.0% by weight, preferably 0.5 to 7.5% by weight, based on the solid in the polyurethane latex. Before the addition, it is diluted with water, if appropriate. The degree of dilution has no influence on the coagulation point of the finished mixture.

The amount of dyestuff or pigment added depends on the desired colour shade of the finished article.

Fillers can be added in amounts of up to 800% by weight, based on the solid in the polyurethane latex. Filler amounts of up to 100% by weight prove to be most suitable for bonding nonwovens and for the production of dipping goods. In the case of heavy coatings, in particular on carpet backing, amounts of 100–300% by weight, and in exceptional cases 500–800% by weight, of filler are incorporated.

The electrolytes are added in amounts of 0.01–20% by weight—based on the latex dry substance. They are in all cases added as dilute aqueous—for example 1N-solutions. Their amount essentially depends on the ionomeric character of the polyurethane. Electrolyte amounts of 0.1–5.0% by weight are usually required in the known polyurethane latices.

The coagulation point of preferred heat-sensitive polyurethane latex mixtures according to the invention will be between 30° and 60° C., and for processing reasons it will particularly preferably be adjusted to temperatures between 35° and 45° C. The coagulation point established in the mixtures according to the invention varies only by less than 5° C., if at all, even during storage over a period of several days—given cool storage with no evaporation.

Coagulation of the mixture under the influence of heat is brought about by radiant or convected heat in hot gases or liquids, depending on the article to be produced. The choice of the specific coagulation properties depends exclusively on the article to be produced, and not on the composition of the mixture.

EXAMPLE 1

A heat-sensitive latex mixture is mixed from the following constituents (all the data are in parts by weight):

(a) 200 parts of a 50% (solids content) anionic polyurethane dispersion of the polymer composition described in Example 1b of DE-OS (German Published Specification) 2,426,657, 15 parts of a mixture of 7.5 parts of water and 7.5 parts of a polyurea-modified polyether-polyurethane according to Example 1 of DE-OS (German Published Specification) 3,330,197 and its corresponding U.S. Pat. No. 4,535,111 and (b) 58 parts of water and 10 parts of 10% strength aqueous calcium chloride.

The constituents of a and b are premixed and then b is stirred into a. The solids content of this latex mixture is 35%. The coagulation temperature, measured in a 50 ml glass beaker warmed in a waterbath at 80° C., is 36° C.

The coagulate is compact and cannot be redispersed in water.

The coagulation properties of the mixture are not changed by storage thereof at room temperature for a period of 2 weeks.

EXAMPLE 2

A heat-sensitive latex mixture is mixed from the following constituents (all the data are in parts by weight):

(a) 250 parts of a 40% (solids content) cationic polyurethane dispersion which was prepared as follows: A mixture of 150 parts (0.075 mol) of a polycarbonate based on caprolactone and hexanediol with an OH number of 56 and 75 parts (0.075 mol) of a polyethylene oxidepolypropylene oxide polyether started on butanol (OH number 26; 78.3% by weight of ethylene oxide) are dehydrated at 110° C. for 30 minutes. The mixture is cooled to 80° C., 45.23 parts (0.2692 mol) of hexamethylene-diisocyanate are added and the mixture is heated up to a constant NCO value of 3.32%. 6.56 parts (0.055 mol) of N-methyldiethanolamine are then added and the mixture is heated again up to a constant NCO value of 1.57%, the reaction temperature being kept at 60° C. The reaction product is diluted with 1,100 ml of acetone and reacted with 6.4 parts (0.0374 mol) of isophoronediamine, dissolved in 40 parts of water, at 40° C. for 5 minutes. The salt is then built in the mixture with 10 parts (0.0275 mol) of a 50% strength aqueous solution of N-methyl-N-(methylaminocarbonyl)-aminomethanesulphonic acid, after 5 minutes a dispersion is obtained with 460 parts of water and the acetone is distilled off immediately. A fine-particle size dispersion with a solids content of 40.0% and a viscosity of 15 seconds (measured in a Ford cup, 4 mm nozzle) is obtained.

(b) 22 parts of water, 10 parts of a mixture of 5 parts of water and 5 parts of a polyurea-modified polyether-polyurethane according to Example 1 of DE-OS (German Published Specification) 3,330,197 and its corresponding U.S. Pat. No. 4,535,111, and 6 parts of a 1 normal aqueous ammonia solution.

The constituents of a and b are premixed and b is then stirred into a. The solids content of the latex mixture is 35%. The coagulation temperature—measured as described in Example 1—is 36° C.

The resulting coagulate is solid and cannot be redispersed in water. The coagulation properties of the mixture are not changed by storage thereof at room temperature over a period of 2 weeks.

EXAMPLE 3*)

As a control, a heat-sensitive latex mixture is mixed from the following constituents (all the data are in parts by weight):

(a) 200 parts of a 50% strength anionic polyurethane dispersion according to Example 1a, (b) 45 parts of water and 20 parts of the reaction product of a quaternary polyether-amine and a diisocyanate, as described in DOS (German Published Specification) 2,837,314 and marketed by Sandoz AG as ®CARTAFIX U, which is in particular the reaction product of about 0.5 mol of toluene diisocyanate with about 1 mol of a quaternary compound of the formula $$CH_3-\overset{\oplus}{\underset{\diagdown}{N}}\begin{matrix}(C_2H_4O)_p(C_3H_6O)_xH \\ -(C_2H_4O)_q(C_3H_6O)_yH \\ (C_2H_4O)_r(C_3H_6O)_zH\end{matrix}$$

$$CH_3SO_4^{\ominus}$$

wherein the sum of x, y, and z is 16 and the sum of p, q and r is 13, (c) 20 parts of acetic acid (10% strength) to establish a pH of 4.7.

Component b is premixed and stirred into a and the pH is then established by addition of component c. The solids content of the mixture (based on the polymer in the dispersion) is 35%. The coagulation temperature of the mixture—measured as described in Example 1—is 50° C. and drops rapidly to 42° C. on storage. The resulting coagulate is pasty and can be redispersed in water.

EXAMPLE 4*)

As a control, a heat-sensitive latex mixture is prepared from the following constituents (all the data are in parts by weight):

*)Example according to European Patent A-0,167,189, but without the addition of a blowing agent.

(a) 200 parts of a 50% (solids content) anionic polyurethane dispersion according to Example 1a, (b) 55 parts of water and 30 parts of polyvinylmethyl ether with a molecular weight of 40,000, ®LUTONAL M 40, BASF AG, Ludwigshafen.

Component b is premixed and stirred into a. The solids content of the mixture (based on the polymer in the dispersion) is 35%. The coagulation temperature of the mixture—measured as described in Example 1—is above 75° C. Coagulation is not complete and the coagulate is redispersable.

We claim:

1. Heat-sensitive polyurethane dispersions consisting essentially of
   (a) polyurethane latex based on a dispersed polyurethane having a content of ionic group of 2 to 200 milliequivalents per 100 g of solid and a content of ethylene oxide units of 0 to 25% by weight, based on the solid,
   (b) 0.01 to 20% by weight, based on the solid in latex (a), of electrolyte,
   (c) 0.1 to 20% by weight, based on the solid in latex (a), water-soluble polyetherpolyurethane stabilizer corresponding to the formula $$\begin{array}{c}NH-CO-NH-R_3[-NH-CO-O-(CHR_6-\\-CHR_7O)_x-(CHR_9-O)_y-R_{10}]_m\\ \left(\overset{R_1}{\underset{|}{\phantom{X}}}\right)\\ N-CO-NH-R_4[-NH-CO-O-(CHR_6-\\-CHR_7O)_x-(CHR_8-CHR_9O)_y-R_{10}]_m\\ \underset{n}{\phantom{X}}\\ R_2\\ |\\ HN-CO-NH-R_5[-NH-CO-O(CHR_6-\\-CHR_7O)_x-(CHR_8-CHR_9-O)_yR_{10}]_m\end{array}$$

wherein
$R_1$ and $R_2$ independently represent $C_2$-$C_4$alkylene or $C_3$-$C_{14}$cycloalkylene,
$R_3$, $R_4$ and $R_5$ independently represent alkylene, cycloalkylene or arylene, which is unsubstituted or substituted by $C_1$-$C_4$-alkyl or halogen,
$R_6$, $R_7$, $R_8$ and $R_9$ independently represent hydrogen or methyl,
$R_{10}$ represents $C_1$-$C_{18}$ alkyl, $C_6$-$C_{18}$ aryl, $C_7$-$C_{18}$ aralkyl or $C_2$-$C_{18}$ alkenyl,
n represents the values 0 to 50,
m represents the values 1 to 4
x represents the values 5 to 100, and
y represents the values 0 to 100.

2. In the process of producing hollow articles by coagulating a latex dispersion of a polymeric material, the improvement comprises said dispersion being a polyurethane dispersion according to claim 1.

3. In the process of producing sheet-like structures by coagulating a latex dispersion of a polymeric material, the improvement comprises said dispersion being a polyurethane dispersion according to claim 1.

4. In the process of producing elastomeric filaments by coagulating a latex dispersion of a polymeric material, the improvement comprises said dispersion being a polyurethane dispersion according to claim 1.

5. Heat-sensitive polyurethane dispersions according to claim 1, characterized in that the ionic groups of the polyurethane latex are anionic or cationic.

* * * * *

UNITED STATES PATENT AND TRADEMARK OFFICE
CERTIFICATE OF CORRECTION

PATENT NO. : 4,888,379
DATED : December 19, 1989
INVENTOR(S) : Wolfgang Henning, Wolfram V. Langenthal, Hermann Perrey, Hellmut Striegler.

It is certified that error appears in the above-identified patent and that said Letters Patent is hereby corrected as shown below:

The top portion of the chemical formula at column 8, line 15 should correctly read:

-- $NH-CO-NH-R_3[-NH-CO-O(CHR_6-$ $-CHR_7O)_x-(CHR_8-CHR_9O)_y-R_{10}]_m$ --

In column 8, line 30, "$C_2-C_4$ alkylene" should correctly read --$C_2-C_{14}$ alkylene--.

Signed and Sealed this

Twenty-third Day of April, 1991

Attest:

HARRY F. MANBECK, JR.

Attesting Officer

Commissioner of Patents and Trademarks